F. P. SLOCUM.
Revolver.
No. 1,839.
Reissued Dec. 20, 1864.
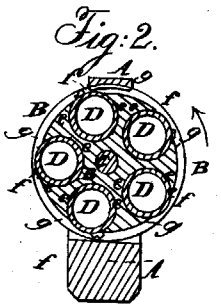
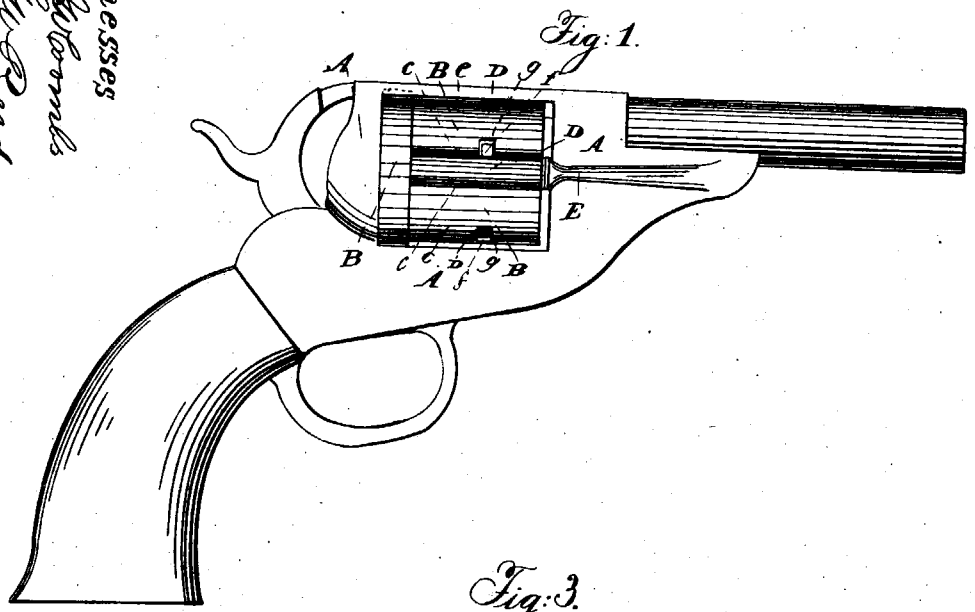
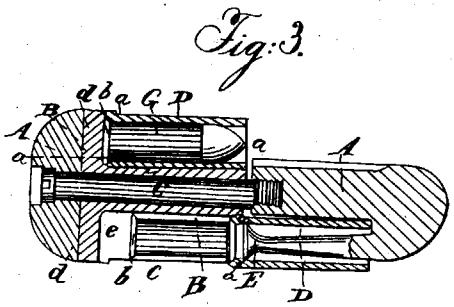
Witnesses
J. W. Coombs
G. W. Reed
Inventor
A. P. Slocum
per Munn & Co
Attorneys
N. PETERS, PHOTO-LITHOGRAPHER, WASHINGTON, D. C.

UNITED STATES PATENT OFFICE.

THE BROOKLYN FIRE-ARMS COMPANY, OF BROOKLYN, N. Y., ASSIGNEE, BY MESNE ASSIGNMENTS, OF FRANK P. SLOCUM.

IMPROVEMENT IN REVOLVING FIRE-ARMS.

Specification forming part of Letters Patent No. 38,204, dated April 14, 1863; Reissue No. 1,839, dated December 20, 1864.

*To all whom it may concern:*

Be it known that SAML. W. SLOCUM, of the city of Brooklyn, in the county of Kings and State of New York, did obtain, through an assignment from FRANK P. SLOCUM, duly recorded in the Patent Office, Letters Patent No. 38,204, dated April 14, 1863, for certain new and useful Improvements in Revolving Fire-Arms, which Letters Patent have since become, by an assignment from SAML. W. SLOCUM aforesaid, the property of THE BROOKLYN FIRE-ARMS COMPANY, of the city of Brooklyn, aforesaid; and we, SAMUEL W. SLOCUM, president, and FRANK P. SLOCUM, secretary of THE BROOKLYN FIRE-ARMS COMPANY aforesaid, do hereby declare, on the part of said company, that the following is a full, clear, and exact description of the said improvements, reference being had to the accompanying drawings, forming part of this specification, in which—

Figure 1 is a side view of a pistol with the improvements. Fig. 2 is a transverse section of the same through the rotating cylinder. Fig. 3 is a horizontal section of the same directly through the axis of the cylinder.

Similar letters of reference indicate corresponding parts in the several figures.

The principal object of this invention is to provide for the loading of a revolving fire-arm with metallic cartridges carrying their own priming in hollow flanges projecting circumferentially around their rear ends without having the revolving cylinder of the arm open at its rear end; and to this end it consists in the construction of a revolving fire-arm with a number of independently-movable chambers fitted to the revolving cylinder, their number corresponding with the number of charges the cylinder is to contain.

It also consists in the employment, in combination with such a system of movable chambers arranged to slide in and out of the revolving cylinder in a direction parallel with its axis, of a stationary piston secured to the frame of the arm, for the purpose of expelling the discharged cartridge-shells from the said chamber by a forward movement of the chambers from the cylinder.

It also consists in providing the longitudinally-movable chambers with external projections to work in longitudinal openings provided in the cylinder for the purpose of giving a hold to the thumb or finger, and thereby enabling the said chambers to be easily moved backward and forward within the cylinder as required for loading and for the expulsion of the discharged cartridge-shells; and it further consists in providing notches in the sides of the aforesaid longitudinal openings of the cylinder for the purpose of receiving the aforesaid projections on the said chambers, and thereby preventing the forward movement of the said chambers within the cylinder when the said chambers have been pushed back into the cylinder into position for firing.

To enable others skilled in the art to make and use the invention, we will proceed to describe its construction and operation.

A is the frame of the arm, constructed substantially as in other revolving fire-arms.

B is the revolving cylinder, fitted to a fixed axis-pin, C, secured in the frame in any suitable manner in a position parallel with the bore of the barrel.

D D are the independently-movable chambers, made of cylindrical form both internally and externally, their bores being of suitable caliber to receive the cylindrical portions of the cartridge-shells, and their length being sufficient to contain the whole of a cartridge, including the bullet. The bores of these chambers are countersunk at the rear ends, as shown at *a a* in Fig. 3, for the reception of the flanges *b b* of the cartridge-shells. The said chambers are fitted to slide longitudinally and turn freely in cylindrical cavities *e e*, bored in the cylinder from its front end parallel with its axis, at equal distances apart and at equal distances from its axis, the said cavities having longitudinal openings *c c* on their outer sides from the front end of the cylinder nearly to their bottoms, a small portion only being of circular form to entirely surround the rear ends of the chambers when the latter are pushed back, and the width of the said openings being slightly greater than the diameter of the flanged portion of the cartridge-shell, but less than the external diameters of the chambers. The said cavities *e e* are not bored through the rear of the cylinder; but the rear portion is left solid for a sufficient depth or thickness to form a breech to the several chambers, as shown at

*d d* in Fig. 3. On the exterior of each of the said chambers there is a small projection, *f*, which fits snugly into a notch, *g*, formed in one side of the opening *c c* in its respective cavity *e e* of the cylinder, the position of the said projections and notches being such that the said projections can only enter the said notches when the chambers are pushed back to the breech of the cylinder. When pushed into the said notch the said projections prevent the forward movement of the chambers in the cylinder.

E is the stationary piston attached rigidly to the right-hand side of the front part of the frame A, with its head pointing in a rearward direction and its face just in front of the cylinder. This piston is parallel with the axis of the cylinder, and its length is not quite equal to the length of the chambers D D. The diameter of its head is such that it fits loosely into the bores of the chambers, but is larger than the interior of the cartridge-shells.

To load this fire-arm the cylinder is turned to bring the chambers one at a time opposite the piston E, and when each chamber has been brought to this position it is turned, by applying the thumb to its projection *f*, far enough to remove the said projection from its notch *g*, and the chamber is then slid forward on the piston. If there be a discharged cartridge-shell in the chamber, the piston stops it from moving forward with the chamber beyond the front of the cylinder, and the chamber, in its continued forward movement, leaves the said shell in the cavity *e* of the cylinder, as shown in Fig. 2, where F represents the shells. By now turning the right-hand side of the arm downward the shell drops out through the opening *c c*. The new cartridge is then inserted through the opening *c c* into the cavity *e* and the chamber moved back over the said cartridge to the breech *d* and then turned to bring its projection *f* into the notch *g* and secure it.

On the upper side of Fig. 3 a chamber is shown in its place within the cylinder with a cartridge, G, within it. When the chambers are secured in the cylinder the cartridges are secured by reason of the countersinks *a a* in the chambers being in contact with their flanges.

Other means may be adopted to secure the chambers in the cylinder; but the projections *f f* and notches *g g* form a very convenient means. If the projections should slip out of the notches, they will strike the top of the frame in the revolution of the cylinder, and so be pushed into the notches, the said projections not being able to clear the top of the frame without being home in their notches.

It will be understood that an important function of the longitudinal openings *c c* of the cylinder is to enable the longitudinally-movable chambers to be reached by the thumb or finger, and thereby moved back and forth, and that an important function of the projections *f f* on the said chambers is to form a hold for the thumb and finger in effecting such movement. It is therefore obvious that any conformation of that part of the surface of each chamber which is exposed through its respective longitudinal opening *c c*, whereby a hold is formed for the finger or thumb, is equivalent to the said projections so far as this one of their functions is considered.

What we claim as new, and desire to secure by Letters Patent, is—

1. The construction of a revolving fire-arm with independent longitudinally-movable chambers, in combination with openings in the sides of the cylinder of sufficient size to permit the lateral insertion of metallic cartridges without removing the chambers entirely from the cylinder.

2. The stationary piston, applied in combination with the revolving cylinder and its independently-movable chambers, substantially as and for the purpose herein described.

3. The projections *f f* on the longitudinally-movable chambers D D, in combination with the longitudinal openings *c c* of the cylinder, substantially as and for the purpose herein specified.

4. The notches *g g* in the sides of the longitudinal openings *c c* of the cylinder, in combination with the projections *f f* on the longitudinally-movable chambers, substantially as and for the purpose herein set forth.

SAML. W. SLOCUM,
*President*,
FRANK P. SLOCUM,
*Secretary*,
*For the Brooklyn Fire-Arms Company.*

Witnesses:
HENRY T. BROWN,
J. W. COOMBS.